(12) United States Patent
Chambers et al.

(10) Patent No.: US 8,521,543 B2
(45) Date of Patent: Aug. 27, 2013

(54) METHOD AND APPARATUS FOR LOAD-BASED BILLING IN COMMUNICATION NETWORKS

(75) Inventors: Michael D. Chambers, Plainfield, IL (US); Cynthia Florkey, Chicago, IL (US); Ruth Schaefer Gayde, Naperville, IL (US)

(73) Assignee: Alcatel Lucent, Paris (FR)

( * ) Notice: Subject to any disclaimer, the term of this patent is extended or adjusted under 35 U.S.C. 154(b) by 2337 days.

(21) Appl. No.: 10/796,425

(22) Filed: Mar. 9, 2004

(65) Prior Publication Data

US 2005/0216382 A1 Sep. 29, 2005

(51) Int. Cl.
*G06Q 10/00* (2012.01)

(52) U.S. Cl.
USPC .................. 705/1.1; 75/7.35; 75/34

(58) Field of Classification Search
None
See application file for complete search history.

(56) References Cited

U.S. PATENT DOCUMENTS

| | | | | |
|---|---|---|---|---|
| 6,397,055 B1 * | 5/2002 | McHenry et al. | ............. | 455/408 |
| 6,574,464 B1 * | 6/2003 | Chen | ............. | 455/406 |
| 6,690,929 B1 * | 2/2004 | Yeh | ............. | 455/406 |
| 6,707,894 B1 * | 3/2004 | Halford | ............. | 379/114.2 |
| 6,947,724 B2 * | 9/2005 | Chaney | ............. | 455/408 |
| 7,245,609 B2 * | 7/2007 | D'Eletto | ............. | 370/352 |
| 7,535,849 B2 * | 5/2009 | Laiho et al. | ............. | 370/241.1 |
| 7,849,008 B1 * | 12/2010 | Ekker et al. | ............. | 705/40 |
| 2004/0024859 A1 * | 2/2004 | Bloch et al. | ............. | 709/223 |
| 2004/0067758 A1 * | 4/2004 | Laiho | ............. | 455/456.1 |
| 2004/0218564 A1 * | 11/2004 | Henrikson | ............. | 370/331 |

* cited by examiner

*Primary Examiner* — Asfand Sheikh
(74) *Attorney, Agent, or Firm* — Fay Sharpe LLP (57) ABSTRACT

A method of load-based billing for customers in a communication network, wherein each customer has a calling plan. The method comprises monitoring utilization of the network in real-time via a switching center in the network; detecting at the switching center a Usage Level Event based upon the occurrence of a predetermined event trigger; informing a usage level application of the Usage Level Event; recording at the usage level application the Usage Level Event; and determining at the usage level application whether action should be taken based upon the Usage Level Event. When it is determined that action should be taken, the usage level application reports the Usage Level Event to a set of network elements via the usage level application and the switching center, where the set of network elements includes a customer billing platform and a broadcast message application. Further, a set of customers is notified of a change in pricing for calls based upon the Usage Level Event through the broadcast message application and a messaging center.

27 Claims, 8 Drawing Sheets

*FIG. 8*

METHOD AND APPARATUS FOR LOAD-BASED BILLING IN COMMUNICATION NETWORKS

BACKGROUND OF THE INVENTION

The present invention relates generally to the art of telecommunications, and, more particularly, to a method and apparatus for load-based billing in communication networks.

By way of background, communication network usage is typically driven by subscriber demand. This applies to many types of communication networks, including wireless networks (CDMA, GSM, UMTS), wireline networks (PSTN, PLMN), and 3GPP/3GPP2 multimedia networks. Communication networks are often "over-engineered" in order to support high usage scenarios (e.g., Mother's Day). Currently, however, there is no way for the service provider to stimulate demand in real time during the times when the network is underutilized. Conversely, in times of crisis (e.g., natural disasters) service providers may want to discourage non-essential calling. Currently, there is no mechanism for treating such situations.

Thus, there is a need in the art for a method and apparatus for load-based billing in communication networks, wherein underutilization and/or overutilization of a network can be detected and analyzed by a network element in real-time and customers can be provided with a stimulus to better optimize traffic levels on the network.

SUMMARY OF THE INVENTION

A method and apparatus for load-based billing of customers in a network are provided.

In one aspect of the invention, a method of load-based billing for customers in a communication network is provided. The method comprises monitoring utilization of the network in real-time via a switching center in the network; detecting at the switching center a reportable statistical event based upon the occurrence of a predetermined event trigger; informing a usage level application of the reportable statistical event; and determining at the usage level application whether a Usage Level Event has occurred. When it is determined that a Usage Level Event has occurred, the usage level application records the Usage Level Event, reports the Usage Level Event to a set of network elements via the usage level application and the switching center, where the set of network elements includes a customer billing platform and a broadcast message application. Further, a set of customers is notified of a change in pricing for calls based upon the Usage Level Event through the broadcast message application and a messaging center.

In another aspect of the invention, an apparatus for load-based billing of customers in a communication network is provided. The apparatus comprises means for monitoring utilization of the network in real-time via a switching center in the network; means for detecting at the switching center a reportable statistical event based upon the occurrence of a predetermined event trigger; means for informing a usage level application of the reportable statistical event; and means for determining at the usage level application whether a Usage Level Event has occurred. The apparatus further comprises (1) means for recording the Usage Level Event, (2) means for reporting the Usage Level Event to a set of network elements via the usage level application and the switching center and (3) means for notifying the customers of a change in pricing for calls based upon the Usage Level Event through the broadcast message application and a messaging center, when it is determined that a Usage Level Event has occurred. The set of network elements includes a billing platform and a broadcast message application.

In accordance with yet another aspect of the present invention, an apparatus for load-based billing of subscribers in a communication network is provided. The apparatus includes a plurality of communication devices operative to receive and transmit at least one of voice, text, multimedia and data communication; a switching center operative to route calls to and from the communication devices in the network and monitor the utilization of the network; a subscriber database operative to store subscriber profile information and mobility management information; a messaging center operative to direct messages to and receive messages from the communication devices; a billing platform operative to receive call detail records from the switching center; a usage level application operative to analyze load usage in the network and determine whether a Usage Level Event has occurred; and a broadcast message application containing a set of predetermined messages relating to Usage Level Events.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings.

DETAILED DESCRIPTION OF THE PREFERRED EMBODIMENTS

It is to be understood that the specific method and apparatus illustrated in the attached drawings and described in the following specification are simply embodiments of the inventive concepts defined in the appended claims. Therefore, specific examples and characteristics related to the embodiments disclosed herein are not to be considered as limiting, unless the claims expressly state otherwise.

Figure 1:
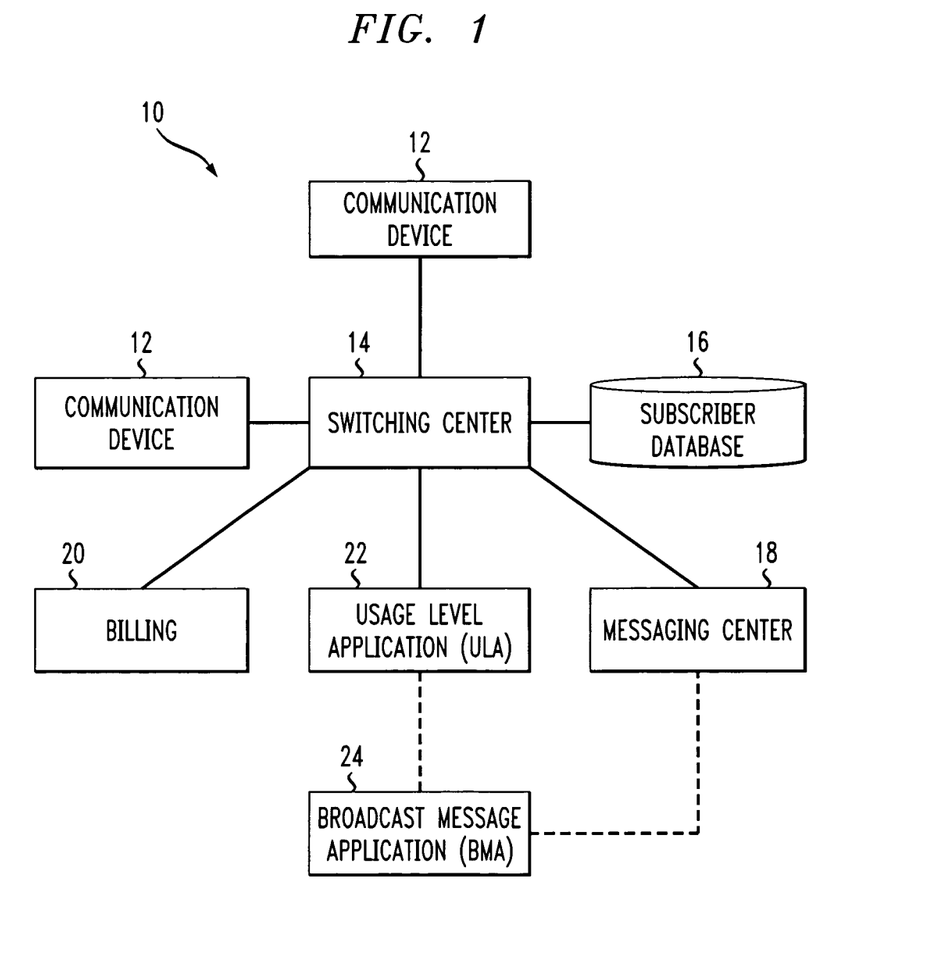
FIG. 1 is a functional block diagram of a communication network suitable for implementing aspects of the present invention.

Referring now to FIG. 1, there is shown a functional block diagram of a basic communication network 10 suitable for implementing aspects of the present invention. The network 10 may be wireless (CDMA, GSM, UMTS), wireline (PSTN, PLMN) or 3GPP/3GPP2 multimedia, for example. At least one communication device 12 is shown as being in communication with the network 10. The communication device 12 may be of any type for voice, text, multimedia, and/or data communication, including mobile telephones, networked personal computers, handheld computing or digital devices, legacy landline devices, or any other such device.

Each communication device 12 communicates with a switching center 14 that directs communications between the communication devices 12 and various communication channels in the network 10. The main function of the switching center 14 is to route calls and perform call handling functions. The switching center 14 generally routes calls by accessing information in a subscriber database 16. The network 10 may include multiple switching centers 14 that are collocated or spaced geographically apart.

The subscriber database 16 typically contains subscriber/customer profile information, and it may also contain mobility management information, in the case of wireless networks. The subscriber database 16 may maintain at least two types of subscriber information: subscription information and location information. Subscription information refers to the services that each subscriber is authorized to use under the subscriber's calling plan. The subscriber database 16 uses the subscription information to verify that the subscriber is authorized for certain types of services. Location information is used to properly route and bill the call.

The network 10 also includes a messaging center 18 that is in networked communication with the switching center 14. The messaging center 18 receives messages of all types from and directs messages of all types to communication devices. The switching center 14 and the messaging center 18 may be located together or may be remote from each other, as is known in the art. The messaging center 18 may include a database (not shown) for storing messages and subscriber information.

The network 10 further includes a billing platform 20, which receives call detail records from the switching center 14. The billing platform 20 typically stores information concerning each subscriber's calling plan. A call detail record (CDR) is written by the switching center 14 whenever a call is originated or terminated through the switching center 14. A CDR typically includes data such as the subscriber ID, the digits dialed, and the duration of the call.

The elements of the network 10 described thus far are standard in the industry, and their operation is well known in the art. The present invention comprises an improvement to the communication network 10 of the type shown in the drawings. The improvement includes adding a usage level application (ULA) 22 to analyze load usage in the network 10 based on current measurements from the switching center 14. The ULA 22 is essentially an application server running on a platform. Protocols to the ULA 22 include, but are not limited to, SIP, AIN, or IS-771. The improvement also includes adding a broadcast message application (BMA) 24, which may be integrated into the ULA 22 or into some other network element, such as the messaging center 18. The BMA 24 contains predetermined messages relating to various Usage Level Events. In accordance with the present invention, the CDR may also contain a record of a special Usage Level Event that applies at the time the CDR is written.

It will be appreciated that certain components of the network 10, such as the switching center 14, the subscriber database 16, the messaging center 18, the billing platform 20, the ULA 22, and the BMA 24 may each be implemented with one or more specialized or general purpose computer systems. Such systems commonly include a high speed processing unit (CPU) in conjunction with a memory system (with volatile and/or non-volatile memory), an input device, and an output device, all as known in the art.

Figure 2:
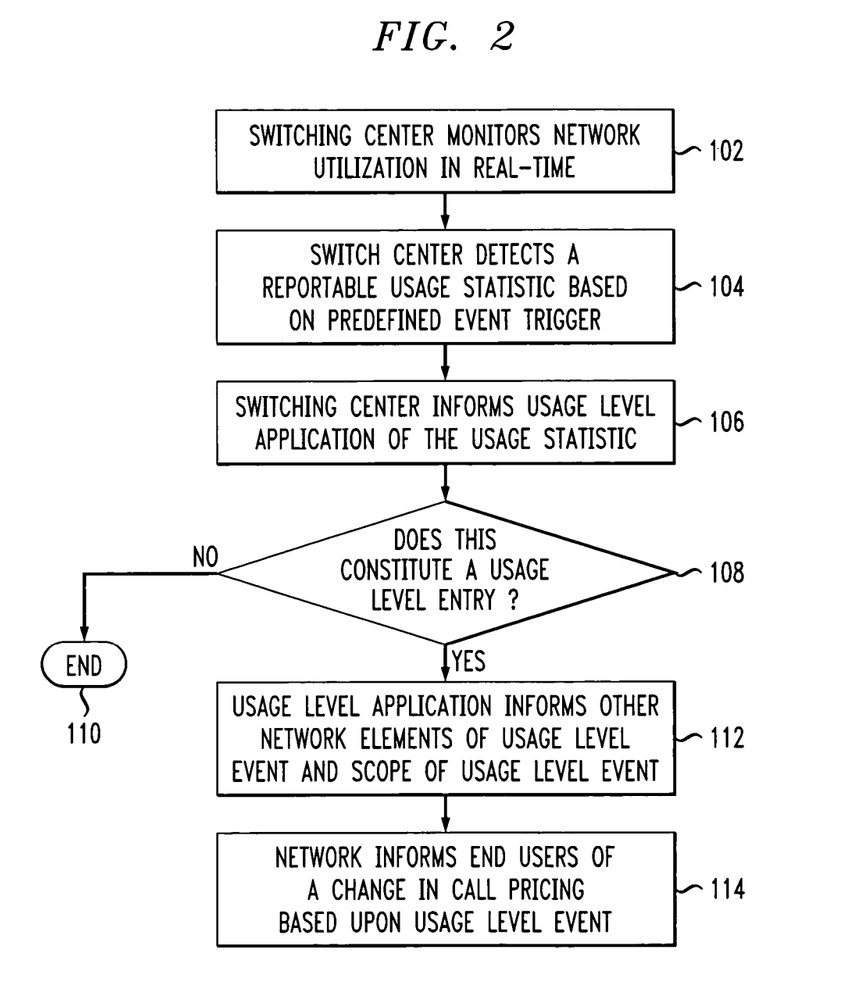
FIG. 2 is a flow chart illustrating a load-based billing method in accordance with the present invention.

FIG. 2 is a flow chart 100 illustrating a basic load-based billing method that may be implemented in the network 10 in accordance with an aspect of the present invention. Initially, the switching center 14 monitors network utilization in real-time (step 102). As system utilization is monitored, the switching center 14 detects a reportable usage statistic as determined by predefined event triggers (step 104). The switching center provides certain statistics of utilization levels to the ULA 22 (step 106), Next, the ULA 22 determines whether a Usage Level Event has occurred, based upon one or more predefined event triggers (step 108). Triggers may include any one of the following: (1) a lower/upper level threshold, (2) trending thresholds, and (3) duration thresholds, or (4) some combination of these thresholds.

If the ULA 22 determines that a Usage Level Event has not occurred, then the ULA 22 takes no further action and waits for additional reportable statistics (step 110). Otherwise, the ULA 22 informs other elements in the network 10, such as the message service 18 and the billing platform 20 that a Usage Level Event has occurred and the scope of the Usage Level Event (step 112). The network 10, through the BMA 24 and the messaging center 18, informs the subscribers (or end users) of a change in call pricing based upon the Usage Level Event (step 114).

Figure 3:
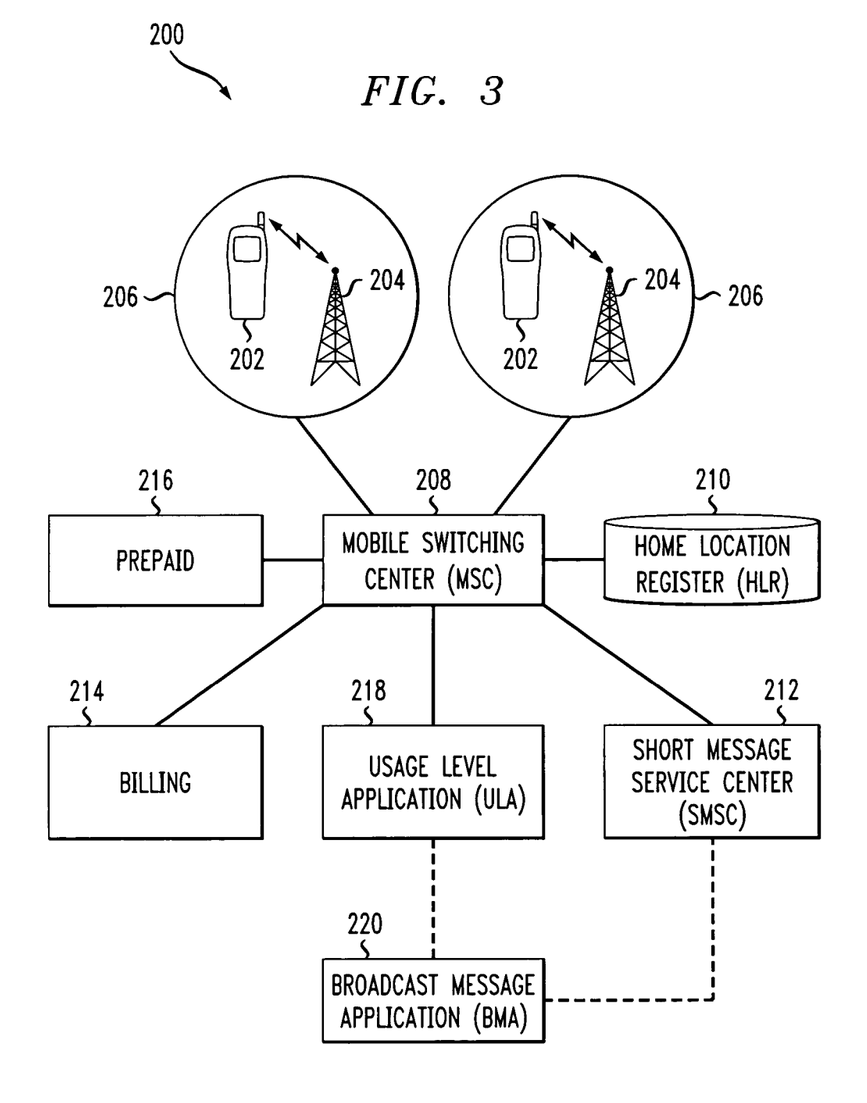
FIG. 3 is a functional block diagram of a conventional wireless communication network suitable for implementing aspects of the present invention.

It is to be appreciated that the load-based billing method described above may be implemented in a variety of communication networks, including a conventional wireless network (e.g., GSM, CDMA). FIG. 3 shows a functional block diagram of a conventional wireless network 200 to illustrate an example of an operating environment for the present invention. As shown in FIG. 3, at least one mobile station 202 for voice, text, and/or data communication is in wireless communication with the network 200.

The network 200 may support a messaging service, such as short text messaging, whereby short text messages may be transmitted and/or received by the mobile station 202. As an example, the short text message service could include or conform to the SMS standard that is part of the GSM Phase 1 standard, or any other wireless communication SMS standard, such as IS-41/IS-637.

Voice, text, multimedia, and/or data communications are conveyed to the mobile stations 202 via the network 200. The network 200 includes any number of wireless transceiver-stations 204 that correspond to a communication cell 206, and the network 200 may include one or more cells 206. The mobile station 202 within the cell 206 communicates with the network 200 via a wireless link with the appropriate transceiver station 204 as known in the art. The transceiver station 204 communicates with a mobile switching center (MSC) 208 that directs communications between the mobile station 202 and various communication channels.

The MSC 208 is a switch that generally routes calls and performs call and mobility handling functions. The network 200 may include multiple MSCs that are collocated or spaced geographically apart. The MSC 208 generally routes calls by accessing information in a home location register (HLR) 210.

The HLR 210 is a functional database containing subscriber profile and mobility management information. The HLR 210 maintains subscription and location information. The HLR 210 uses the subscription information to verify that the subscriber is authorized for prepaid wireless service, for example. One type of location information is the last MSC 208 that was registered as serving the subscriber. This is stored in the form of a mobile switching center identification number, which identifies the appropriate MSC. Other location information is used to calculate the cost of the call. In addition, the subscriber is identified using a mobile station identification number. Location information is used to properly route and bill the call.

The network 200 includes at least one short message service center (SMSC) 212 that is in networked communication with the MSC 208. As defined in IS-637, the Short Message Service (SMS) allows the exchange of short messages between the mobile station 202 and the wireless network 200, and between the wireless network 200 and an external device capable of transmitting and optionally receiving short messages. The external device may be a voice telephone, a data terminal or a short message entry system.

The SMS consists of message entry features, administration features, and message transmission capabilities. These features are distributed between the wireless network 200 and the SMSC 212 that together make up the SMS system. The SMSC 212 may be either separate from or physically integrated into the wireless network 200. Short message entry features are provided through interfaces to the message center and the mobile station 202. Senders use these interfaces to enter short messages, intended destination addresses, and various delivery options.

SMSC interfaces may include features such as audio response prompts and DTMF reception for dial-in access from voice telephones, as well as appropriate menus and message entry protocols for dial-in or dedicated data terminal access. Mobile station interfaces may include keyboard and display features to support message entry. Additionally, a wireless voice service subscriber can use normal voice or data features of the mobile station to call an SMS system to enter a message.

The SMSC 212 is also defined in IS-41/IS-637 and GSM MAP. The MSC 208 and the SMSC 212 may be located together or may be remote from each other, as is known in the art. The SMSC 212 may include a database (not shown) for storing messages.

The network 200 also includes a billing platform 214. It is well known that wireless service providers will typically lock each of their customers into a particular calling plan, featuring a fixed monthly rate that buys them a certain number of airtime minutes and other extra features that may be added on. Such calling plan information may be stored in the billing platform 214. The billing platform 214 continuously receives call detail records from the MSC 208. In accordance with present invention, the CDR may include a record that a Usage Level Event applies at the time the CDR was written.

A service provider may also offer prepaid wireless as an alternative to long-term contracts. Like prepaid phone cards, these plans let customers buy a block of airtime that they can draw from until it runs out. In this regard, the network 200 may also include a prepaid platform 216 in networked communication with the MSC 208 for providing prepaid wireless services to subscribers.

When the prepaid subscriber enters calling information (i.e., dials a telephone number) via the mobile station 202, the mobile station 202 signals to the MSC 208. The MSC 208 communicates with the prepaid platform to determine whether this call should be allowed for this subscriber at this time. Communication and control may occur via various protocols, including ISUP or TCAP. The format of both messages complies with the ANSI SS7 ISUP industry standard.

The prepaid platform 216 determines whether the subscriber has sufficient funds in his or her account to connect the call. The prepaid platform 216 is made up of several components that have switching, audio, prepaid information processing, and billing capabilities (not shown). The prepaid platform 216 determines whether to allow the call based on the funds in the subscriber's account and collects and processes the information needed to bill the call. The prepaid platform 216 supports a variety of different interfaces, including, but not limited to, CAMEL, IS-826, IS-771 or ISUP messaging.

The ULA 218 analyzes load usage in the network 200, while the BMA 220, which is in networked communication with the ULA 218, maintains predetermined messages for the various Usage Level Events.

It is to be appreciated that the MSC 208, the HLR 210, the SMSC 212, the billing platform 214, the prepaid platform 216, the ULA 218, and the BMA 220 may each be implemented with one or more specialized or general purpose computer systems.

Figure 4:
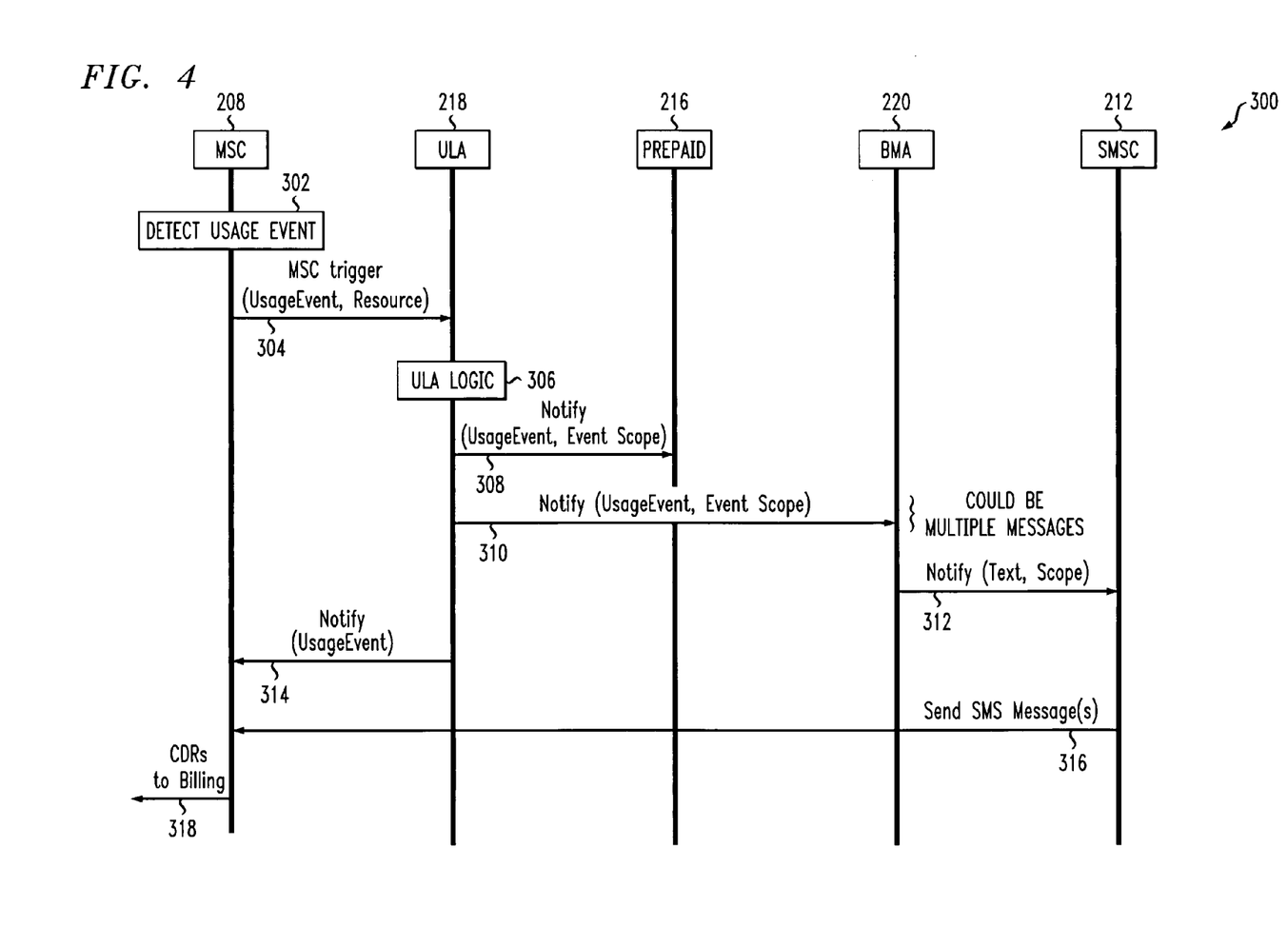
FIG. 4 is a call flow diagram of an implementation of the load-based billing method in a wireless network.

FIG. 4 is a call flow diagram 300 depicting an implementation of the load-based billing method in the wireless network 200, whereby a Usage Level Event is detected and notice of the new calling rate is sent to the appropriate subscribers. The method may be implemented through software that is distributed throughout the network 200 as described below.

Referring now to FIG. 4, the MSC 208 detects a "Usage Level Event" (step 302). A Usage Level Event may be detected in the following manner. It is well known to those skilled in the art that the MSC 208 typically monitors network occupancy and utilization, including processor occupancy, memory usage, trunk utilization, cell/RF utilization, voice coder utilization, and signaling link occupancy, among other things. The MSC 208 may collect data concerning such items as radio network occupancy (how hard the processor controlling the cells is working), trunk occupancy (how many trunks are busy or idle), call processing occupancy (how much time the CPU controlling call processing is working versus idle), and signaling occupancy (how hard the processor controlling the sending and receiving of signaling messages is working) in real-time throughout the day.

The MSC 208 will report measurements obtained in regard to system occupancy and utilization to the ULA 218 (step 304). The MSC 208 may use some threshold values to determine which statistics to send to the ULA 218, or it may send all statistics to the ULA 218. The ULA 218 will then apply threshold values and trending analysis, to determine if a Usage Level Event has occurred. The determination may be based on (1) upper/lower thresholds, (2) trending thresholds, (3) duration thresholds or (4) a combination of these thresholds.

In accordance with the present invention, the ULA 218 determines the Usage Level Event (e.g. "low level 1") and the resources impacted (e.g., specific cells 206 or the entire area covered by the MSC 208) (step 306). The ULA logic could be based on low or high usage threshold, a trend in usage threshold (e.g., moving toward low usage over past 100 minutes), or a duration threshold (e.g., reaching a low usage threshold for over 10 minutes), or some combination of these.

The ULA 218 records the Usage Level Event and also performs logic to determine what action, if any, needs to occur. The ULA 218 employs a program to determine the appropriate action(s), based upon inputs from multiple MSCs or based upon repeated triggers from the same MSC. Additionally, the ULA 218 will determine the "scope" of the Usage Level Event. For example, the ULA 218 could determine that the scope of the Usage Level Event applies to all calls to the 312 area code, to 312-xxx office code, or to a set of cells on a single MSC.

Once it is determined that action is required, the ULA 218 will inform the prepaid platform 216 that a high/low Usage Level Event is in effect and the scope of the event (step 308). The prepaid platform 216 has billing rates associated with the Usage Level Event and would apply these to the applicable calls. Further, the ULA 218 will inform the BMA 220 that a Usage Level Event has occurred as well as the scope of the event (step 310). The BMA 220 then sends a broadcast short message request to the SMSC 212 (step 312).

Figure 5:
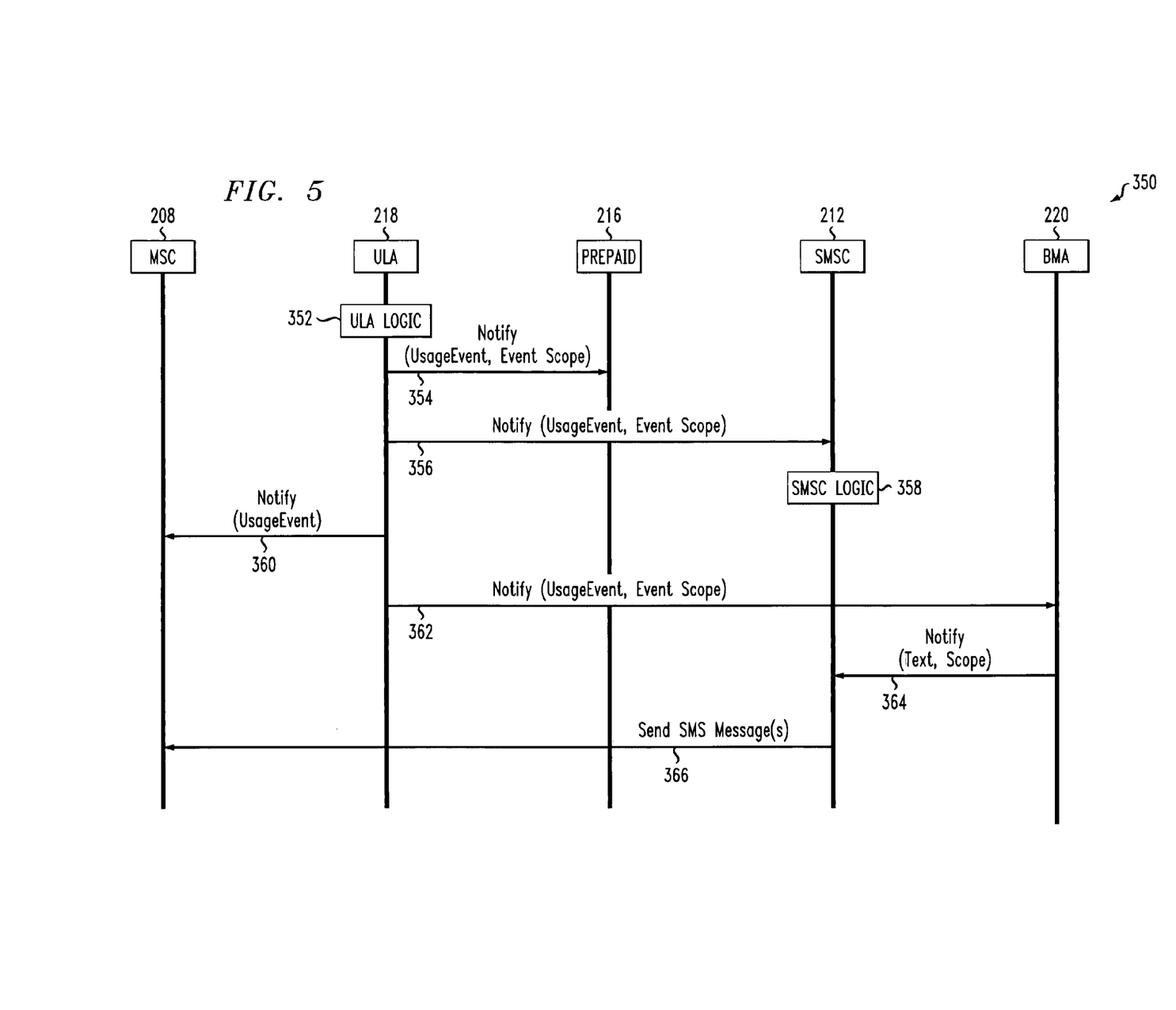
FIG. 5 is a call flow diagram illustrating a further example of the load-based billing method in the wireless network.

As known to those skilled in the art, when the MSC 208 receives input that a point-to-point message is to be sent to a user, the SMSC 212 sends an SMS request to the HLR 210 for the location and availability of the mobile station 202. For example, if the HLR 210 replies "user is available, serving MSC=xyz," then the SMSC sends a message to the MSC 208 for delivery to the mobile station 202. If the HLR 210 says "user is not available," the message is saved at the SMSC 212 and the HLR 210 sets a flag in the subrecord for "messages pending." When the user registers later, the MSC 208 or the HLR 210 will send "user now available" indication to the SMSC 212, and the SMSC 212 will deliver a message to the MSC 208 for delivery to the end user. If the event expires before "user now available," the SMSC 212 will not send the message, as illustrated in FIG. 5.

Returning now to FIG. 4, in step 314, the ULA 218 informs the MSC 208 that a Usage Level Event is active as well as the scope of the event. For all calls originated/terminated within the scope, the MSC 208 will mark the CDR with an indicator that the calls occurred during the Usage Level Event. The "scope" will have location information (e.g. the appropriate MSC and/or cell). The location information that defines scope could be the MSC 208, a list of cells 206, a combination of these or something like "anywhere." The SMSC 212 sends short messages to the appropriate MSC 208 (step 316).

In parallel to the above steps, as calls are originated and terminated at the MSC 208, the MSC 208 will transfer CDRs to the billing platform 214, which will then assign the billing rates to calls (step 318). Calls marked with a special Usage Level Event will be billed at the appropriate special rate.

The order of the steps in this process may be important in some situations. For example, it may be important for a subscriber to know about the high/low price event before their billing entity (the billing platform 214 or the prepaid platform 216) begins to record the new pricing. In other words, a customer may want to know before making calls if the billing rate is going up. Therefore, steps 308 and 314 may need to happen after steps 310, 312 and 316.

FIG. 5 is a call flow diagram 350 illustrating an additional embodiment of the present invention, whereby the wireless network 200 may be notified that a Usage Level Event has ended. Initially, the ULA 218 determines that the Usage Level Event in effect should end (step 352). This could be based on any one of the following: (1) a time interval provisioned at the ULA 218, (2) trigger information from the MSC 208, or (3) the lack of any trigger information from the MSC 208. Next, the ULA 218 informs the prepaid platform 216 that the event has ended (step 354). The ULA 218 then informs the SMSC 212 that the event has ended (step 356). The SMSC 212 may have pending SMS requests that it would need to cancel (step 358). The ULA 218 informs the MSC 208 that the event has ended (step 360). The ULA 218 notifies the BMA 220 of the end of the event (step 362). The BMA 220 sends a message to the SMSC 212 regarding the message to be sent and the scope (step 364). The SMSC 212 sends an SMS message (or messages) to the MSC 208 indicating that the special rates have ended.

Figure 6:
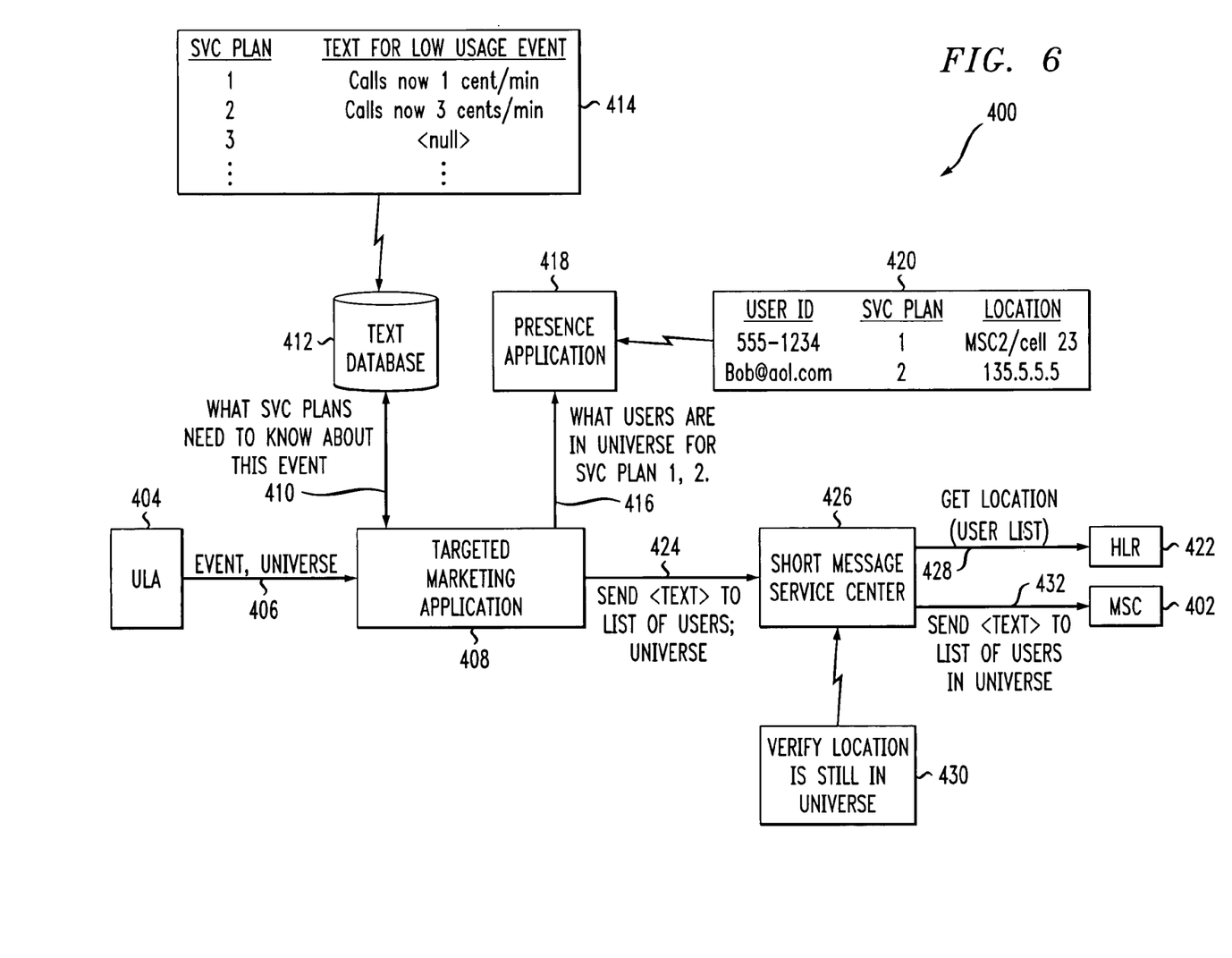
FIG. 6 is a call flow diagram illustrating an implementation of a targeted message method in a wireless network.

FIG. 6 represents a call flow diagram 400 for an alternative embodiment of the present invention whereby targeted messages are sent to specific users in a wireless network. In this scenario, it is assumed that (a) a switching center, such as an MSC 402, has detected a Usage Level Event in the manner described in connection with FIG. 4, (b) the MSC 402 has informed a ULA 404 of the Usage Level Event, and (c) the ULA 404 has recorded the Usage Level Event and determined the next course of action. At this point, the ULA 402 sends a message 406 to a targeted marketing application (TMA) 408, indicating the event and the universe. The main function of the TMA 408 is to apply the appropriate messages, based upon the individual calling plans for the subscribers.

Thus, the TMA 408 sends a request 410 to a database 412 for information regarding which calling plans are impacted by certain Usage Level Events and the new billing rates. The database 412 stores information 414 concerning the appropriate message for each service plan. Next, the TMA 408 sends a query 416 to a location (or presence) application 418 for information 420 concerning which subscribers are active in the "scope of the event" and for plans "impacted by the current event."

The functions and overall operation of the presence application 418 are known to those skilled in the art. For example, the presence application 418 may be used to determine where a particular mobile station is located, with location-based technology currently available. The presence application 418 would query some mobile infrastructure (not shown) to find the physical location of the relevant users with the right service plans. The infrastructure may include an element such as a mobile positioning center, which would query the MSC 402 and/or an HLR 422 to find out where a particular mobile station is located. If the mobile station is currently engaged in a call, then the MSC 402 could reply with the current serving cell. If the users are idle, then the MSC 402 could send a page to the mobile station, which would respond and thereby establish its location.

The presence application 418 may also be used to determine whether the user is there and available or not, and is especially relevant to a data network such as one that America Online (AOL) might have. For example, the entry for a caller in the AOL network may be Bob@aol.com, where with the IP address replaces the cell information. It is to be understood that the present invention does not require phone numbers and a "telephony" sort of context. It could just as easily all apply to a data network model, such as one America Online (AOL) might use. Instead of an MSC that is writing billing records, it would be data network infrastructure. The AOL users would have service plans, and their location might not change when they are active. It is their presence that is relevant—i.e., are they there or not? This concept is similar to Instant Messaging and Buddy Lists.

Returning now to FIG. 6, the TMA 408 sends a request 424 for a specific short message for the appropriate users to a SMSC 426. The SMSC 426 accesses the HLR 422 to determine the user location 428 (MSC and cell). Once the SMSC 426 has the user location information, it must verify that the MSC/cell is within the "scope" 430. It should be noted that mobile users are often on the move. It is possible that the user has changed location during steps 424 and 428. Thus, if the user has not changed location, the SMSC 426 will send a short message 432 to the correct MSC 402.

The general process by which the SMSC 426 sends a message is known to those skilled in the art. For example, the SMSC 426 may send an ANSI-41 SMSDeliveryPointToPoint (SMDPP) INVOKE to the serving MSC 402. For the SMS broadcast application, the SMDPP will include, for example, bearer data and the "location" ID for this event. However, in accordance with the present invention, at least one new parameter will need to be added to this message—i.e., a "user list." This user list could be any identifier to group users/customers (e.g., the user class, the unique user ID, etc.) This parameter is supported by the HLR 422, the MSC 402, the TMA 408, and the SMSC 426.

Figure 7:
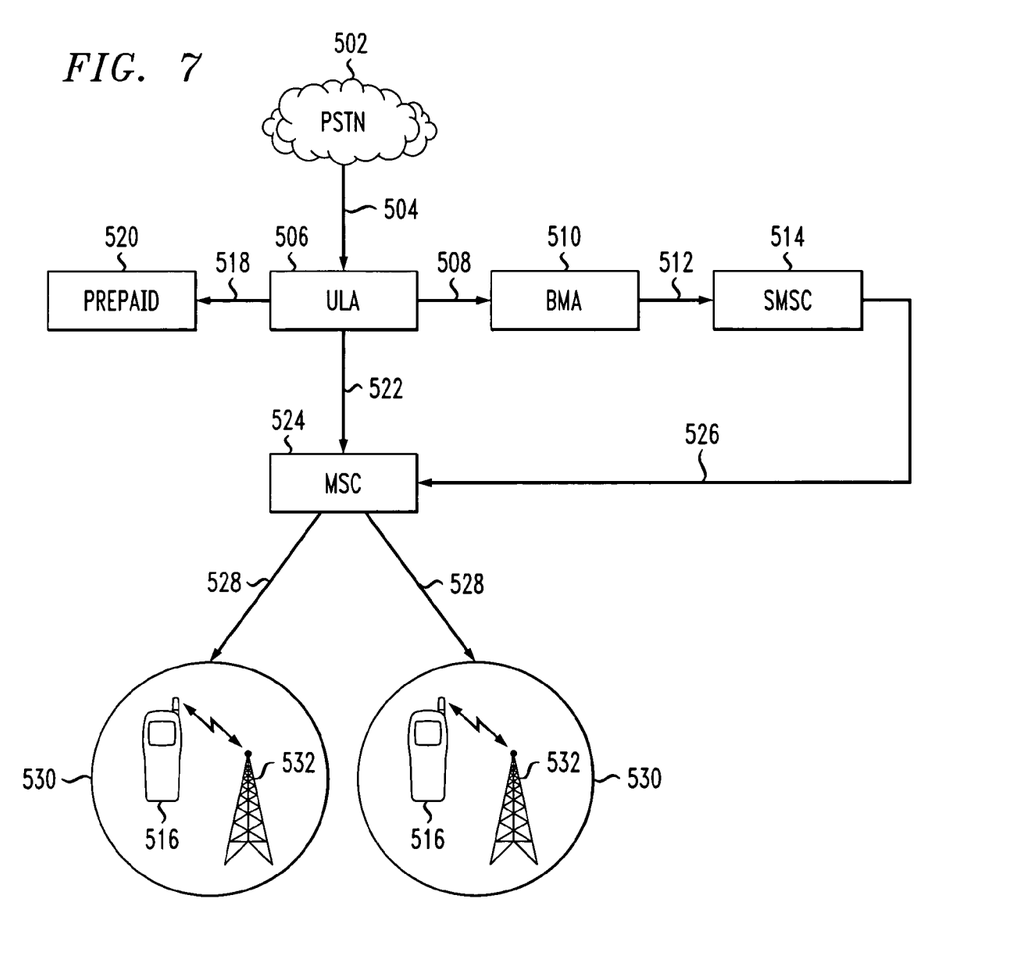
FIG. 7 is a call flow diagram illustrating an alternative implementation of the load-based billing method in a wireless network, based upon input from an external network.

FIG. 7 represents a call flow diagram 500 for an alternative embodiment of the present invention in which one network, such as a wireless network, responds to high usage in another network, such as the PSTN 502. Thus, initially, a toll office in the PSTN 502 detects high usage in the usual manner. The high usage could be due to a natural disaster, such as a hurricane. The toll office in the PSTN 502 sends a message to a ULA (not shown) in the PSTN 502 to indicate high toll network utilization. The ULA in the PSTN 502 would, in turn, send a message 504 to a ULA 506 in the wireless network.

Based upon pre-determined criteria, the ULA 506 decides to inform 508 the BMA 510 that a Usage Level Event has occurred as well as the scope of the event. The BMA 510 then sends a broadcast short message request 512 to the SMSC 514 to send a short message to all mobile stations 516 in the region—e.g., "20 cents/minute for long distance to North Carolina due to Hurricane Isabel." The ULA 506 sends a message 518 to the prepaid platform 520 that toll calls are now to be billed at the new higher rate. The ULA 506 also sends a message 522 to the MSC 524, which informs the MSC 524 that billing records need to indicate the different billing rate. The SMSC 514 sends a broadcast short message 526 to the MSC 524. The message 526 could be sent to multiple MSCs, PBXs, landline switching offices or call session control functions (CSCF), depending upon the type of network(s) involved. The MSC 524 broadcasts a message 528 to the mobile stations 516 in each cell 530 through the appropriate transceiver stations 532.

Alternatively, the load-based billing method of the present invention could be implemented in multimedia wireless networks, such as the new third generation wireless systems (3G), which are being developed through the 3rd Generation Partnership Project (3GPP), such as UMTS (Universal Mobile Telecommunications System). 3GPP is the new worldwide standard for the creation, delivery, and playback of multimedia over new, high-speed wireless networks. 3GPP enables the free sharing of multimedia files between a variety of devices, including wireless phones, PDAs (Personal Digital Assistants), and desktop computers. 3G devices generally include, in addition to a voice communication interface, capability for communication of data and display of data, including video.

Figure 8:
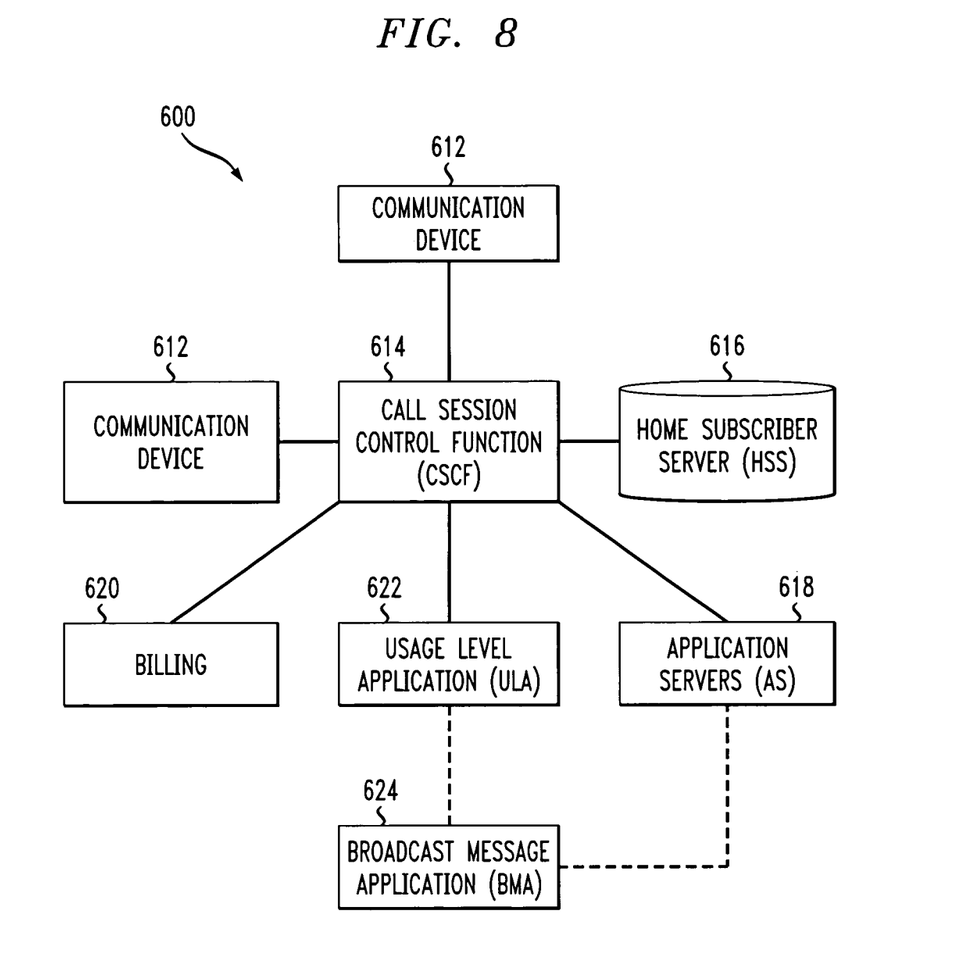
FIG. 8 is a functional block diagram of a multimedia wireless network suitable for implementing aspects of the present invention.

FIG. 8 is a simplified block diagram of a typical multimedia wireless network 600 in which the present invention may also be implemented. The multimedia communication network 600 provides users with a variety of options for communication and is generally known in the art. The network 600 provides access to data networks, such as the Internet, and public telephone networks, including wireless networks. With this network, users are able to transmit and receive multimedia communications, including audio, voice, video, and all types of data.

At least one communication device 612 is shown as being in communication with the network 600. The communication device 612 generally includes an audio interface, such as a microphone and speakers, a visual interface, such as a display, and a user input interface, such as a keyboard or touch pad. The communication device 612 communicates with a switching center, such as a call session control function (CSCF) 614, which directs multimedia communications between the communication devices 612 and various communication channels in the network 600.

A home subscriber servicer (HSS) 616 is coupled to the CSCF 614 via a data link. The HSS 34 typically includes subscriber profile information, including information traditionally associated with a home location register (HLR) for a mobile subscriber. Suitably, the HSS 34 stores information such as user identification, user security information, including network access control information for authentication and authorization, user location information for user registration and locating, and user profiles, including identification of the services subscribed to and other service specific information.

The network 600 also includes any number of application servers (AS) 618 in networked communication with the CSCF 614. A myriad of services and applications may reside in or be coupled to the application servers 36, including multimedia messaging and voicemail services. Thus, the AS 618 perform the SMSC function in this network example.

The network 600 further includes a billing platform 620 that receives call detail records from the CSCF 614. The CDR may contain a record of a special Usage Level Event that applies at the time the CDR is written by the CSCF 614.

The elements of the network 600 described thus far are standard in the industry, and their operation is known in the art. This embodiment of the present invention comprises an improvement to the communication network 600 of the type shown in FIG. 8. The improvement includes adding a ULA 622 to analyze load usage in the network 600 as well as a BMA 24 for storing predetermined messages relating to various Usage Level Events.

The CSCF 614, the HSS 616, the application servers 618, are all processor-based devices with data link interfaces for coupling together as described above and shown in FIG. 8. These devices include one or more processors that execute programs to implement the functionality described herein and generally associated with 3G wireless systems. The flexibility of these processor-based systems permits ready integration into these systems of a load-based billing method and apparatus in accordance with the present invention.

In operation, the load-based billing method of the present invention would function substantially the same in the multimedia communication network 600 as it does in the conventional wireless network.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of load-based billing for customers in a communication network, the method comprising:
   continuously monitoring utilization of the network by a plurality of network users in real-time via a switching center in the network;
   detecting at the switching center a reportable statistical event based upon the occurrence of a predetermined event trigger, wherein the predetermined event trigger comprises a trending threshold, which comprises the rate of change that a particular measurement exceeds a pre-determined threshold;

informing a usage level application of the reportable statistical event;
determining at the usage level application whether a Usage Level Event has occurred;
recording at the usage level application the Usage Level Event, when it is determined that a Usage Level Event has occurred;
reporting the Usage Level Event to a set of network elements via the usage level application and the switching center, when it is determined that a Usage Level Event has occurred, the set of network elements including a customer billing platform and a broadcast message application; and
notifying a set of customers of a change in pricing for calls based upon the Usage Level Event through the broadcast message application and a messaging center, when it is determined that a Usage Level Event has occurred.

2. The method defined in claim 1, wherein the predetermined event trigger further comprises an upper threshold, a lower threshold, or a duration threshold, or a combination of these thresholds.

3. The method defined in claim 1, wherein the determination of whether a Usage Level Event has occurred is based upon an upper threshold, a lower threshold, a trending threshold, or a duration threshold, or a combination of these thresholds.

4. The method defined in claim 1, wherein the communication network comprises a wireless network and the switching center comprises a mobile switching center.

5. The method defined in claim 4, wherein the set of network elements further includes a prepaid platform.

6. The method defined in claim 4, further comprising:
via the switching center, writing billing records for the customers and marking calls in the billing records that are based upon the Usage Level Event; and
transferring the billing records to the billing platform.

7. The method defined in claim 4, further comprising:
determining at the usage level application that a Usage Level Event should be terminated based upon a set of usage event termination criteria;
informing the prepaid platform, the messaging center, the broadcast message application, and the mobile switching center that the Usage Level Event has terminated; and
notifying the customers via the messaging center that the change in pricing has terminated.

8. The method defined in claim 4, wherein:
the utilization of the network includes radio network occupancy, trunk occupancy, call processing occupancy, signaling occupancy, or a combination of these.

9. The method defined in claim 1, wherein the communication network comprises a multimedia communication network and the switching center comprises a call session control function.

10. The method defined in claim 1, wherein the communication network comprises a landline network and the switching center comprises a landline switching office.

11. In a communication network, a method of load-based billing for a service provider of communication services having a plurality of customers, the method comprising:
monitoring utilization of the network by a plurality of network users in real-time via a switching center in the network;
detecting at the switching center a reportable statistical event based upon the occurrence of a predetermined event trigger, wherein the predetermined event trigger comprises a trending threshold, which comprises the rate of change that a particular measurement exceeds a pre-determined threshold;
informing a usage level application of the reportable statistical event;
determining at the usage level application whether a Usage Level Event has occurred;
recording at the usage level application the Usage Level Event and a scope of the event, when it is determined that a Usage Level Event has occurred;
sending a message to a targeted marketing application, the message indicating the Usage Level Event and the scope of the event, wherein the scope of the event includes location information;
retrieving from a subscriber database billing rate information for the calling plans based upon the Usage Level Event;
querying the targeted marketing application for information concerning the customers that are active within the scope of the Usage Level Event and the calling plans that are impacted by the Usage Level Event; and
sending a message to the customers that are active within the scope of the Usage Level Event, the message including a notification to the customers of a temporary change in pricing based upon the Usage Level Event.

12. The method defined in claim 11, wherein:
the communication network comprises a wireless communication network;
the switching center comprises a mobile switching center;
the subscriber database comprises a home location register; and
the messaging center comprises a short message service center.

13. The method defined in claim 11, wherein the message from the short message service center includes a customer list parameter, the customer list parameter comprising an identifier for groups of customers or discrete customers.

14. An apparatus for load-based billing of subscribers in a communication network, the apparatus comprising:
a switching center operative to: route calls to and from a plurality of communication devices in the network and monitor the utilization of the network, continuously monitor utilization of the network by a plurality of communication devices in real-time, detect a reportable statistical event based upon the occurrence of a predetermined event trigger, wherein the predetermined event trigger comprises a trending threshold, and inform a usage level application of the reportable statistical event, wherein the trending threshold comprises the rate of change that a particular measurement exceeds a pre-determined threshold;
a subscriber database operative to store subscriber profile information and location information;
a messaging center operative to direct messages to and receive messages from the communication devices;
a billing platform operative to receive call detail records from the switching center;
a usage level application operative to receive the reportable statistical event, analyze load usage by the plurality of communication devices in the network, and determine whether a Usage Level Event has occurred; and
a broadcast message application including a set of predetermined messages relating to Usage Level Events.

15. The apparatus defined in claim 14, further comprising a targeted marketing application operative to target messages to specific customers in the network.

16. The apparatus defined in claim 14, wherein:
the communication network comprises a wireless communication network;
the switching center comprises a mobile switching center;
the subscriber database comprises a home location register; and
the messaging center comprises a short message service center.

17. The apparatus defined in claim 14, wherein:
the communication network comprises a multimedia communication network;
the switching center comprises a call session control function; and
the subscriber database comprises a home subscriber service.

18. The apparatus defined in claim 14, wherein:
the communication network comprises a landline network;
the switching center comprises a landline switching office; and
the subscriber database comprises an internal subscriber record database.

19. A non-transitory computer-usable data carrier storing instructions that, when executed by a computer, cause the computer to perform a method of load-based billing of customers in a communications network, the method comprising:
continuously monitoring utilization of the network by a plurality of users in real-time;
detecting a reportable statistical event based upon the occurrence of a predetermined event trigger, wherein the predetermined event trigger comprises a trending threshold, which comprises the rate of change that a particular measurement exceeds a pre-determined threshold;
informing a usage level application of the reportable statistical event;
determining at the usage level application whether action should be taken based upon the Usage Level Event;
recording at the usage level application the Usage Level Event, when it is determined that a Usage Level Event has occurred;
reporting the Usage Level Event to a set of network elements via the usage level application and the switching center, when it is determined that a Usage Level Event has occurred, the set of network elements includes a billing platform and a broadcast message application; and
notifying the customers of a change in pricing for calls based upon the Usage Level Event through the broadcast message application and a messaging center, when it is determined that a Usage Level Event has occurred.

20. The non-transitory computer-usable data carrier defined in claim 19, wherein the event trigger comprises an upper threshold event, a lower threshold event, or a duration threshold event, or a combination of these events.

21. The non-transitory computer-usable data carrier defined in claim 19, wherein the communication network comprises a wireless network and the switching center comprises a mobile switching center.

22. The non-transitory computer-usable data carrier defined in claim 19, wherein the set of network elements further includes a prepaid platform.

23. The non-transitory computer-usable data carrier defined in claim 19, wherein the method further comprises:
writing billing records for the customers and marking calls in the billing records that are based upon the Usage Level Event; and
a transferring mechanism configured to transfer the billing records to the billing platform.

24. The non-transitory computer-usable data carrier defined in claim 22, wherein the method further comprises:
determining at the usage level application that a Usage Level Event should terminate based upon a set of event termination criteria;
informing the prepaid platform, the messaging center, and the mobile switching center that the Usage Level Event has terminated;
notifying the subscribers via the messaging center that the change in pricing has terminated.

25. The non-transitory computer-usable data carrier defined in claim 19, wherein the utilization of the network includes radio network occupancy, trunk occupancy, call processing occupancy, signaling occupancy, or a combination of these.

26. The non-transitory computer-usable data carrier defined in claim 19, wherein the communication network comprises a multimedia communication network and the switching center comprises a call session control function.

27. The non-transitory computer-usable data carrier defined in claim 19, wherein the communication network comprises a landline communication network and the switching center comprises a landline switching office.

* * * * *